United States Patent
Lee et al.

(10) Patent No.: US 11,289,707 B2
(45) Date of Patent: Mar. 29, 2022

(54) ALL-SOLID SECONDARY BATTERY AND METHOD OF MANUFACTURING THE SAME

(71) Applicants: Samsung Electronics Co., Ltd., Suwon-si (KR); Samsung SDI Co., Ltd., Yongin-si (KR)

(72) Inventors: Yonggun Lee, Suwon-si (KR); Toshinori Sugimoto, Hwaseong-si (KR); Saebom Ryu, Suwon-si (KR); Yuichi Aihara, Kanagawa (JP); Dongmin Im, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 207 days.

(21) Appl. No.: 16/550,482

(22) Filed: Aug. 26, 2019

(65) Prior Publication Data
US 2020/0152986 A1    May 14, 2020

(30) Foreign Application Priority Data
Nov. 14, 2018    (KR) .................. 10-2018-0140096

(51) Int. Cl.
H01M 4/62       (2006.01)
H01M 10/0562    (2010.01)
H01M 4/02       (2006.01)

(52) U.S. Cl.
CPC ....... *H01M 4/622* (2013.01); *H01M 10/0562* (2013.01); *H01M 2004/028* (2013.01); *H01M 2300/0091* (2013.01)

(58) Field of Classification Search
CPC ..... H01M 4/621–623; H01M 10/0562; H01M 4/137; H01M 4/1399; H01M 4/602;
(Continued)

(56) References Cited

U.S. PATENT DOCUMENTS

| | | | |
|---|---|---|---|
| 6,573,004 B1 * | 6/2003 | Igarashi | C08L 25/10 429/217 |
| 2009/0305139 A1 * | 12/2009 | Oh | H01M 4/134 429/231.8 |

(Continued)

FOREIGN PATENT DOCUMENTS

| | | |
|---|---|---|
| JP | 2017223661 A | 12/2017 |
| KR | 101850901 B1 | 4/2018 |

(Continued)

OTHER PUBLICATIONS

S. Tanaka et al., "Acrylonitrile-grafted poly(vinyl alcohol) copolymer as effective binder for high-voltage spinel positive electrode", Journal of Power Sources 358, p. 121-127 (Year: 2017).*

(Continued)

*Primary Examiner* — Eric R Smith
(74) *Attorney, Agent, or Firm* — Cantor Colburn LLP

(57) ABSTRACT

An all-solid secondary battery including: a cathode; an anode; and a solid electrolyte layer interposed between the cathode and the anode, wherein the cathode includes a cathode active material, wherein the anode includes an anode current collector and an anode active material layer on the anode current collector, wherein the anode active material layer includes a binder and an anode active material that does not include an alkali metal, wherein the binder includes a polymer main chain and a polyvinyl alcohol-containing copolymer, and wherein the polymer main chain includes polyvinyl alcohol, a polyvinyl alcohol derivative, or a combination thereof, and the polyvinyl alcohol-containing copolymer has at least one repeating unit linked to the polymer main chain.

21 Claims, 8 Drawing Sheets

(58) Field of Classification Search
CPC ...... H01M 4/604; H01M 4/606; H01M 4/608; H01M 4/622; H01M 4/623; H01M 6/181; H01M 8/0221; H01M 8/0239; H01M 8/0284; H01M 8/0289; H01M 8/1018–1093; H01M 2008/1095; H01M 10/0565; H01M 10/414–429; H01M 2300/0082

See application file for complete search history.

(56) References Cited

U.S. PATENT DOCUMENTS

| | | | |
|---|---|---|---|
| 2010/0151335 A1* | 6/2010 | Senga | H01M 10/0562 429/322 |
| 2011/0049745 A1 | 3/2011 | Katayama et al. | |
| 2014/0038049 A1* | 2/2014 | Chung | H01M 4/1393 429/217 |
| 2016/0049660 A1* | 2/2016 | Hwang | H01M 4/587 429/217 |
| 2017/0329282 A1 | 11/2017 | Theurillat-Bonjour | |
| 2019/0027756 A1* | 1/2019 | Narutomi | H01M 4/133 |

FOREIGN PATENT DOCUMENTS

| | | |
|---|---|---|
| KR | 20180038831 A | 4/2018 |
| KR | 20180046574 A | 5/2018 |
| KR | 20180076709 A | 7/2018 |

OTHER PUBLICATIONS

J. He and L. Zhang, "Polyvinyl alcohol grafted poly(acrylic acid) as water-soluble binder with enhanced adhesion capability and electrochemical performances for Si anode", Journal of Alloys and Compounds 763, p. 228-240 (Year: 2018).*

* cited by examiner

ALL-SOLID SECONDARY BATTERY AND METHOD OF MANUFACTURING THE SAME

CROSS-REFERENCE TO RELATED APPLICATION

This application claims priority to and the benefit of Korean Patent Application No. 10-2018-0140096, filed on Nov. 14, 2018, in the Korean Intellectual Property Office, and all the benefits therefrom under 35 U.S.C. § 119, the content of which is incorporated herein by reference in its entirety.

BACKGROUND

1. Field

The present disclosure relates to an all-solid secondary battery and a method of manufacturing the same.

2. Description of the Related Art

All-solid secondary batteries have been manufactured by stacking electrode layers and solid electrolyte layers and pressing the stacked layers using a warm isostatic press to obtain a large-capacity all-solid secondary battery. However, an all-solid secondary battery manufactured in such a manner has poor performance due to decreased binding strength of the electrode layers, for example, the binding strength between an anode current collector and an anode active material layer of an anode or binding strength of the anode active material layer.

In order to solve these problems, there have been attempts to manufacture an all-solid secondary battery by increasing the amount of a polyvinylidene fluoride binder used in the electrode layers. However, when increased amount of polyvinylidene fluoride is used, interfacial resistance between an electrode layer and a solid electrolyte layer may increase, and thus the capacity of an all-solid secondary battery may decrease.

Therefore, there is still a need for an improved material for an all-solid secondary battery, and a battery including the same.

SUMMARY

Provided are novel all-solid secondary batteries.

Additional aspects will be set forth in part in the description which follows and, in part, will be apparent from the description, or may be learned by practice of the presented embodiments.

According to an aspect of an embodiment, an all-solid secondary battery includes: a cathode; an anode; and a solid electrolyte layer interposed between the cathode and the anode, wherein the cathode includes a cathode active material layer, wherein the anode includes an anode current collector and an anode active material layer on the anode current collector, wherein the anode active material layer includes a binder and an anode active material, and the binder includes a polymer main chain and a polyvinyl alcohol copolymer, wherein the polymer main chain includes polyvinyl alcohol, a polyvinyl alcohol derivative, or a combination thereof, and the polyvinyl alcohol copolymer has at least one repeating unit linked to the polymer main chain, the at least one repeating unit including acrylic acid, fumaric acid, maleic acid, itachonic acid, methylacrylate, ethylacrylate, butylacrylate, isobutylacrylate, 2-hexylacrylate, cyclohexylacrylate, hydroxyethylacrylate, methylmethacrylate, ethylmethacrylate, butylmethacrylate, cyclohexylmethacrylate, 2-ethylhexylmethacrylate, hydroxyethylmethacrylate, acrylonitrile, acrylamide, dimethylacrylamide, polyethylene glycol, propylene glycol, 1,2-butadiene, 1,3-butadiene, isoprene, a derivative thereof, or a salt thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
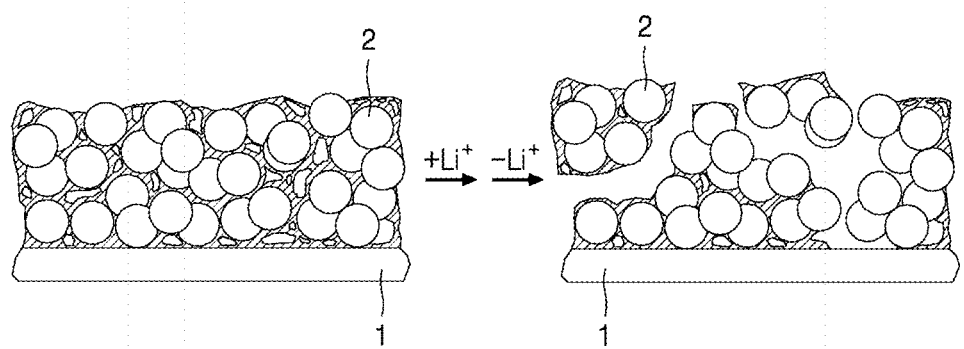
FIG. 1A is a schematic cross-sectional view of an embodiment of an anode active material layer on an anode current collector during charge and discharge of an all-solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an all-solid secondary battery according to an embodiment will be described in detail with reference to the drawings.

Throughout the specification, the term "include" or "comprise" in relation to an element does not preclude other elements but may further include another element, unless otherwise stated.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

As used herein, the term "combination" includes a mixture, an alloy, a reaction product, and the like unless otherwise stated. Throughout the specification, terms "first," "second," and the like are used to distinguish one component from another, without indicating order, quantity, or importance. An expression used in the singular encompasses the expression of the plural, unless otherwise indicated or it has a clearly different meaning in the context. The term "or" refers to "and/or" unless otherwise stated. As used herein, the terms "an embodiment," "embodiments," and the like indicate that elements described with regard to an embodiment are included in at least one embodiment described in this specification and may or may not present in other embodiments. In addition, it may be understood that the described elements are combined in any suitable manner in various embodiments. Unless otherwise defined, technical and scientific terms used herein have the same meaning as commonly understood by one or ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

In an all-solid secondary battery, a polyvinylidene fluoride-based binder, has been used in a cathode active material layer of a cathode, and has been used as a binder of anode active material layers of anode.

However, such a polyvinylidene fluoride-based binder may decrease a binding strength of an anode, such as binding strength between an anode current collector and an anode active material layer, or a binding strength within the anode active material layer, when an all-solid secondary battery is manufactured by a warm isostatic press method, which has been used commercially to manufacture an all-solid secondary battery. When an amount of the polyvinylidene fluoride-based binder is increased to improve the binding strength, interfacial resistance between the anode and a solid electrolyte layer of the all-solid secondary battery may increase. Thus, the all-solid secondary battery may have deteriorated battery performance, such as reduced discharge capacity, reduced rate capability, reduced coulombic efficiency, and reduced lifespan. In addition, when an anode active material layer-forming slurry is prepared using the polyvinylidene fluoride-based binder, a process of preparing the slurry may take a long time due to a high viscosity of the polyvinylidene fluoride-based binder.

Disclosed is an all-solid secondary battery according to an embodiment includes: a cathode; an anode; and a solid electrolyte layer interposed between the cathode and the anode, wherein the cathode includes a cathode active material layer, wherein the anode includes an anode current collector and an anode active material layer on the anode current collector, wherein the anode active material layer includes a binder and an anode active material, and wherein the binder includes a polymer main chain, and a polyvinyl alcohol-containing copolymer, wherein the polymer main chain includes polyvinyl alcohol, a polyvinyl alcohol derivative, or a combination thereof, and the polyvinyl alcohol-containing copolymer has at least one repeating unit linked to the polymer main chain, the at least one repeating unit including acrylic acid, fumaric acid, maleic acid, itaconic acid, methylacrylate, ethylacrylate, butylacrylate, isobutylacrylate, 2-hexylacrylate, cyclohexylacrylate, hydroxyethylacrylate, methylmethacrylate, ethylmethacrylate, butylmethacrylate, cyclohexylmethacrylate, 2-ethylhexylmethacrylate, hydroxyethylmethacrylate, acrylonitrile, acrylamide, dimethylacrylamide, polyethylene glycol, propylene glycol, 1,2-butadiene, 1,3-butadiene, isoprene, a derivative thereof, or a salt thereof.

Figure 1B:
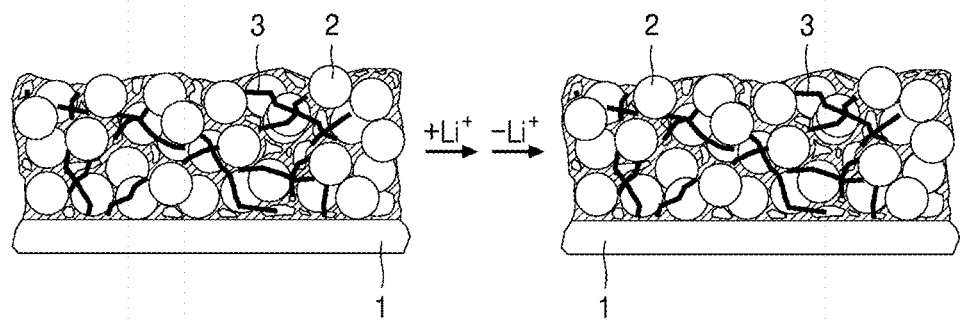
FIG. 1B is a schematic cross-sectional view of an embodiment of an anode active material layer including a polyvinyl alcohol (PVA)-based copolymer that is on an anode current collector during charge and discharge of an all-solid secondary battery.

FIG. 1A is a schematic cross-sectional view of an anode active material layer 2 positioned on an anode current collector 1 during charge and discharge of an all-solid secondary battery according to a comparative embodiment. FIG. 1B is a schematic cross-sectional view of an anode active material layer 2 positioned on an anode current collector 1 and including a polyvinyl alcohol (PVA)-based copolymer 3 during charge and discharge of an all-solid secondary battery according to an embodiment.

Referring to FIG. 1A, in the all-solid secondary battery according to the comparative embodiment, binding between the anode current collector 1 and the anode active material layer 2 or binding inside of the anode active material layer 2 is broken during charge and discharge. Referring to FIG. 1B, in the all-solid secondary battery according to the present embodiment, since the anode active material layer 2 includes the polyvinyl alcohol (PVA)-containing copolymer 3 (also referred to herein as polyvinyl alcohol (PVA)-based copolymer), binding strength between the anode current collector 1 and the anode active material layer 2, or binding strength inside of the anode active material layer 2, is maintained or improved during charge and discharge.

Since the anode active material layer of the anode layer includes a binder containing a polyvinyl alcohol-based copolymer in the all-solid secondary battery, according to an embodiment, the strength and flexibility of the anode active material layer, as well as binding strength between the anode current collector and the anode active material layer and/or the binding strength of the anode active material layer, may be improve. In addition, the all-solid secondary battery may have reduced interfacial resistance between the anode layer and the solid electrolyte, and therefore battery performance such as rate properties, Coulombic efficiency, and lifespan characteristics of the all-solid secondary battery may also be improved.

The polymer main chain may include polyvinyl alcohol, polyvinyl acetate, polyvinyl alcohol having a terminal polar group, a copolymer thereof, or a mixture thereof. For example, the terminal polar group may include a hydroxyl group, a thiol group, a carboxylic acid group, an acid ester group, or a combination thereof. The polymer main chain may be a polymer including polyvinyl alcohol as a main component (e.g., the primary component), a copolymer thereof, or a mixture thereof. For example, the polymer main chain may be a copolymer of polyvinyl alcohol and polyvinyl acetate or a mixture of polyvinyl alcohol and polyvinyl acetate. Since the polymer main chain is highly soluble in water, processability of an anode active material layer-forming slurry may be improved. In addition, since the polymer main chain has sufficient tensile strength and flexibility, the strength and flexibility of the anode active material layer may be improved.

The binder may include a polymer main chain and a polyvinyl alcohol-based copolymer, wherein the polymer main chain includes polyvinyl alcohol or a polyvinyl alcohol derivative, and the polyvinyl alcohol-based copolymer has at least one first repeating unit linked to the polymer main chain, the at least one first repeating unit including acrylic acid, fumaric acid, maleic acid, itaconic acid, a derivative thereof, or a salt thereof. As used herein, the phrase "linked to the polymer main chain" refers to: a case in which the polyvinyl alcohol-based copolymer is linked to the polymer main chain as a side chain, a case in which the polyvinyl alcohol-based copolymer is crosslinked to the polymer main chain, a case in which the polyvinyl alcohol-based copolymer is linked to the polymer main chain via graft polymerization, a case in which the polyvinyl alcohol-based copolymer is linked to one or more segment of the polymer main chain, and/or a case in which the polyvinyl alcohol-based copolymer is linked to the polymer main chain via a linking group. The linking group may be any linking group which is highly soluble in water and which improves processability of the polyvinyl alcohol or the polyvinyl alcohol derivative and the first repeating unit in a process of preparing an anode active material layer-forming slurry. For example, the binder may include a polymer main chain and a polyvinyl alcohol-based copolymer, wherein the polymer main chain includes polyvinyl alcohol or a polyvinyl alcohol derivative, and the polyvinyl alcohol-based copolymer has a first repeating unit linked to the polymer main chain, the first repeating unit including acrylic acid, a derivative thereof, or a salt thereof. The binder may improve the binding strength of the anode active material layer as well as strength and flexibility thereof.

The binder may include a polymer main chain and a polyvinyl alcohol-based copolymer, wherein the polymer main chain includes polyvinyl alcohol or a polyvinyl alcohol derivative, and the polyvinyl alcohol-based copolymer has at least one second repeating unit linked to the polymer main chain, the second repeating unit including methylacrylate, ethylacrylate, butylacrylate, isobutylacrylate, 2-hexylacrylate, cyclohexylacrylate, hydroxyethylacrylate, methylmethacrylate, ethylmethacrylate, butylmethacrylate, cyclohexylmethacrylate, 2-ethylhexylmethacrylate, hydroxyethylmethacrylate, acrylonitrile, acrylamide, dimethylacrylamide, ethylene glycol, propylene glycol, 1,2-butadiene, 1,3-butadiene, isoprene, a derivative thereof, or a salt thereof. For example, the binder may include a polymer main chain and a polyvinyl alcohol-based copolymer, wherein the polymer main chain includes polyvinyl alcohol or a polyvinyl alcohol derivative, and the polyvinyl alcohol-based copolymer has a second repeating unit linked to the polymer main chain, the second repeating unit including methylmethacrylate, a derivative thereof, or a salt thereof. The binder may further improve flexibility of the anode active material layer as well as strength of the anode active material layer.

An amount of the binder may be from about 0.3 weight percent (wt %) to about 15 wt %, or about 1 wt % to about 12 wt %, or about 3 wt % to about 10 wt %, based on a total weight of the anode active material. When the amount of the binder is less than 0.3 wt % based on the total weight of the anode active material, the solubility or dispersibility of the binder in water deteriorates, resulting in insufficient strength of the anode active material layer, deterioration of characteristics of the anode active material layer, and difficulty in treating or handling the anode active material layer. When the amount of the binder is greater than 15 wt %, based on the total weight of the anode active material, the humidity (water content) of the anode active material layer increases, resulting in deterioration in the performance of the all-solid secondary battery. A lower limit of the amount of the binder may be about 3 wt %, without being limited thereto.

The binder may have a weight average molecular weight Mw of about 10,000 Daltons (Da) to about 1,000,000 Da. For example, the binder may have a weight average molecular weight Mw of about 20,000 Da to about 1,000,000 Da. For example, the binder may have a weight average molecular weight Mw of about 30,000 Da to about 1,000,000 Da. For example, the binder may have a weight average molecular weight Mw of about 40,000 Da to about 1,000,000 Da. For example, the binder may have a weight average molecular weight Mw of about 50,000 Da to about 1,000,000 Da. For example, the binder may have a weight average molecular weight Mw of about 60,000 Da to about 1,000,000 Da. For example, the binder may have a weight average molecular weight Mw of about 70,000 Da to about 1,000,000 Da. For example, the binder may have a weight average molecular weight Mw of about 80,000 Da to about 1,000,000 Da. For example, the binder may have a weight average molecular weight Mw of about 90,000 Da to about 1,000,000 Da. For example, the binder may have a weight average molecular weight Mw of about 100,000 Da to about 1,000,000 Da. A method of measuring the weight average molecular weight Mw is not particularly limited and may be any suitable method. For example, the weight average molecular weight Mw may be measured by gel permeation chromatography (GPC) using polystyrene as a standard. The binder having the weight average molecular weight Mw within the above ranges is suitable for preparation of a slurry for forming an anode active material layer of an all-solid secondary battery.

For example, the binder may include at least one of the polyvinyl alcohol-based copolymers represented by Formulae 1 to 3 below.

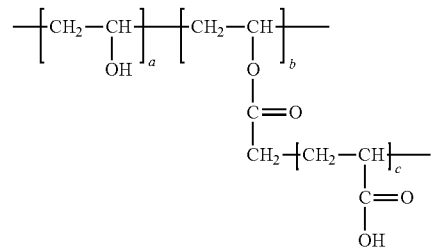

Formula 1

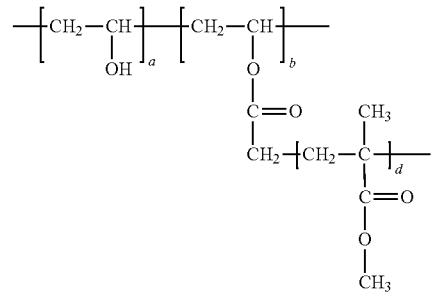

Formula 2

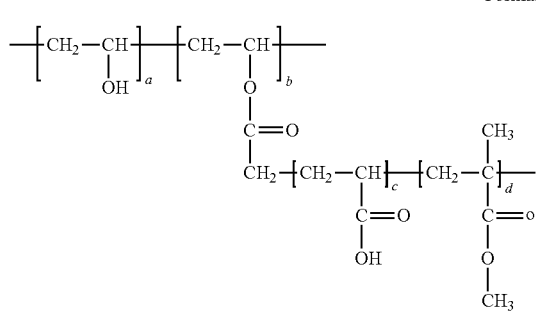

Formula 3

In Formulae 1 to 3,
a is an integer of 30 to 80,
b is an integer of 3 to 20,
c is an integer of 5 to 40, and
d is an integer of 5 to 30.

The polyvinyl alcohol-based copolymer may be prepared by any suitable polymerization or copolymerization method. For example, the polyvinyl alcohol-based copolymer may be prepared by dissolving polyvinyl alcohol and/or a derivative thereof in water by increasing a temperature to about 100° C., adding the first repeating unit and/or the second repeating unit to the solution, and initiating polymerization or copolymerization. Any appropriate polymerization initiator may be used. For example, the polymerization initiator may include: an azo compound such as 2,2'-azobis(2-amidinopropane)hydrochloride or azoisobutyronitrile (AIBN); a persulfate such as potassium persulfate, sodium persulfate, or ammonium persulfate; an organic peroxide such as t-butylhydroperoxide; or a redox initiator such as hydrogen peroxide-tartaric acid or hydrogen peroxide-sodium tartrate.

Figure 2A:
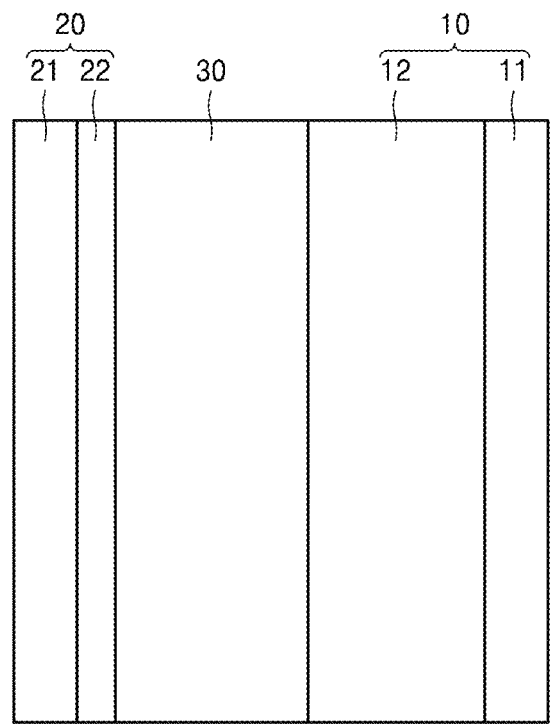
FIG. 2A is a schematic cross-sectional view of an embodiment of an all-solid secondary battery.

FIG. 2A is a schematic cross-sectional view of an all-solid secondary battery according to an embodiment.

As shown in FIG. 2A, the all-solid secondary battery includes: a cathode 10, an anode 20, and a solid electrolyte 30 interposed between the cathode 10 and the anode 20, wherein the cathode 10 includes a cathode current collector 11 and a cathode active material layer 12, and the anode 20 includes an anode current collector 21 and an anode active material layer 22 positioned on the anode current collector 21.

The cathode 10 may include the cathode current collector 11 and the cathode active material layer 12 positioned on the cathode current collector 11.

The cathode current collector 11 may be a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The cathode current collector 11 may be omitted.

The cathode active material layer 12 may include a cathode active material and a solid electrolyte. The solid electrolyte included in the cathode active material layer 12 may have a composition identical to or different from that of a solid electrolyte included in the solid electrolyte layer 30, which will be described later.

The cathode active material may be any suitable compound allowing intercalation/deintercalation of an alkali metal, such as lithium, without limitation.

The compound allowing intercalation/deintercalation of lithium includes at least one of a compound represented by the following formulae: $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aN-i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above may have a coating layer on the surface thereof. Alternatively, a mixture of a compound without a coating layer and a compound having a coating layer, the compounds being selected from the compounds listed above, may be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or a mixture thereof. The coating layer may be formed by using any suitable method, which does not adversely affect physical properties of the cathode active material (e.g., spray coating and immersion (e.g., dip) coating). The coating methods are known, and thus detailed descriptions thereof will not be given.

For example, the cathode active material may be a ternary lithium transition metal oxide having a layered rock-salt type structure, such as $LiNi_xCo_yAl_zO_2$ (NCA) or $LiNi_xCo_yMn_zO_2$ (NCM) (where $0<x<1$, $0<y<1$, $0<z<1$, and $x+y+z=1$). The ternary lithium transition metal oxide having the layered rock-salt type structure may improve the energy density and the thermal stability of the all-solid secondary battery.

In addition, the cathode active material may be a nickel-based composite oxide including 60 wt % or more of nickel such as a lithium nickel cobalt manganese oxide or a nickel cobalt aluminum oxide. Theses nickel-containing cathode active materials may have good ionic conductivity since resistive elements are not generated between particles of a sulfide-based solid electrolyte.

The cathode active material may also be a lithium cobalt oxide having a high true density as well as a high diffusion velocity of lithium ions, in addition to the nickel-based composite oxide. For example, the cathode active material may be a composite cathode active material prepared by coating the lithium cobalt oxide with a nickel-based composite oxide, $LiNbO_2$, $Li_4Ti_5O_{12}$, an aluminum oxide, or the like.

The cathode active material may be in the form of particles having a spherical or elliptical shape. The particle diameter of the cathode active material is not particularly limited and may be within a range applicable to all-solid secondary batteries. Also, the amount of the cathode active material included in the cathode 10 is not particularly limited and may be within a range suitable for use in a cathode of all-solid secondary batteries commonly used in the art.

The cathode 10 may further include an additive such as a conductive agent, a binder, a filler, a dispersant, an ion-conductive adjuvant, or a combination thereof, which are appropriately mixed with the cathode active material and the solid electrolyte.

For example, the conductive agent added to the cathode 10 may include graphite, carbon black, acetylene black, Ketjen black, carbon fiber, metal powder, or a combination thereof. For example, the binder added to the cathode 10 may include styrene-butadiene rubber (SBR), polytetrafluoroethylene, polyvinylidene fluoride, polyethylene, or a combination thereof. Any coating agent, dispersant, or ion-conductive adjuvant suitable for use in an electrode of an all-solid secondary batteries may be added to the cathode 10.

The anode active material layer 22 may include a binder and an anode active material. The anode active material does not comprise an alkali metal prior to a first charge of the all-solid secondary battery.

The anode active material layer 22 may be a layer in which an alkali metal is not deposited or an alkali metal pre-layer before charging the all-solid secondary battery. For example, the alkali metal may include lithium, sodium, potassium, or the like.

The anode current collector 21 may be formed of a material, which does not react, i.e., does not form an alloy and/or a compound, with an alkali metal, such as, lithium metal. For example, the anode current collector 21 may include copper (Cu), stainless steel, titanium (Ti), iron (Fe), cobalt (Co), nickel (Ni), or a combination thereof. The anode current collector 21 may be formed of an alloy or a coating material including one or more metals selected from the above-mentioned metals. For example, the anode current collector 21 may be formed in a plate or foil shape.

The anode active material may include amorphous carbon, gold, platinum, palladium, silicon, silver, aluminum, bismuth, tin, zinc, or a combination thereof. The anode active material may include amorphous carbon and may further include gold, platinum, palladium, silicon, silver, aluminum, bismuth, tin, zinc, or any combination thereof. For example, the amorphous carbon may be carbon black CB, acetylene black AB, furnace black FB, Ketjen black KB, graphene, or a combination thereof. A mixing weight ratio of amorphous carbon to gold or the like in a mixture thereof may be from about 10:1 to about 1:2. When the anode active material is formed of these materials, battery performance, such as rate properties, Coulombic efficiency, and lifespan characteristics of the all-solid secondary battery may further be improved.

Gold, platinum, palladium, silicon, silver, aluminum, bismuth, tin, zinc, or combination thereof used as the anode active material may be in the form of particles having an average particle diameter of 4 micrometers (μm) or less. A lower limit of the average particle diameter of the anode active material may be about 10 nm without being limited thereto. As used herein, the "average particle diameter" or "D50 particle size" refers to a particle diameter corresponding to 50% of the particles in a cumulative particle distribution curve in which particles are accumulated in the order of particle diameter from the smallest particle to the largest particle and the total number of accumulated particles is 100%. The average particle diameter may be measured by a method known to those of skill in the art, for example, using a particle size analyzer or using transmission electron microscope (TEM) images or scanning electron microscope (SEM) images. Alternatively, the average particle diameter may be measured by dynamic light-scattering, in which the number of particles belonging to predetermined particle diameter size ranges is counted, the data is analyzed, and average particle diameter is calculated. When an all-solid secondary battery includes the anode active material having an average particle diameter within the range described above, the battery may have improved performance such as increased rate properties, increased Coulombic efficiency, and increased lifespan characteristics.

Also, the anode active material may include a mixture including a first particle of amorphous carbon and a second particle of a metal or a semiconductor. Examples of the metal or semiconductor may include gold, platinum, palladium, silicon, silver, aluminum, bismuth, tin, zinc, or a combination thereof. An amount of the second particles may be from about 8 wt % to about 60 wt %, for example, from about 10 wt % to about 50 wt %, or about 15 wt % to about 40 wt %, based on a total weight of the mixture. In this case, battery performance of the all-solid secondary battery, such as rate properties, Coulombic efficiency, and lifespan characteristics, may further be improved.

When the anode active material layer 22 includes the above-described binder, the anode active material layer 22 may be adhered to and stabilized on the surface of the anode current collector 21. For example, when the anode active material layer 22 does not include the binder, the anode active material layer 22 may easily be separated from the anode current collector 21. Since the anode current collector 21 is exposed in places from which the anode active material layer 22 is separated from the anode current collector 21, a short-circuit may occur. The anode active material layer 22 may be formed by coating a slurry in which materials constituting the anode active material layer 21 are dispersed onto the anode current collector 21 and the coated slurry is dried. By adding the binder to the anode active material layer 22, the anode active material may stably be dispersed in the slurry. As a result, when the slurry is coated on the anode current collector 21, for example by screen printing, clogging of the screen (e.g., clogging by an aggregate of the anode active material) may be prevented.

The anode active material layer 22 may have a thickness of about 1 μm to about 20 μm, or about 3 μm to about 15 μm, or about 5 μm to about 10 μm, without being limited thereto. When the thickness of the anode active material layer 22 is less than 1 μm, performance of the all-solid secondary battery may not be sufficiently improved. When the thickness of the anode active material layer 22 is greater than 20 μm, performance of the all-solid secondary battery may not be sufficiently improved due to a high resistance of the anode active material layer 22. By using the afore-mentioned binder, the thickness of the anode active material layer 22 may adjusted to an appropriate level.

An additional additives suitable for use in an all-solid secondary battery, such as a filler, a dispersant, or an ion-conductive agent, may be included in the anode active material layer 22 in suitable amounts. The filler, the dispersant, or the ion-conductive agent may be the same as or different from those used in the cathode active material layer 12.

Figure 2B:
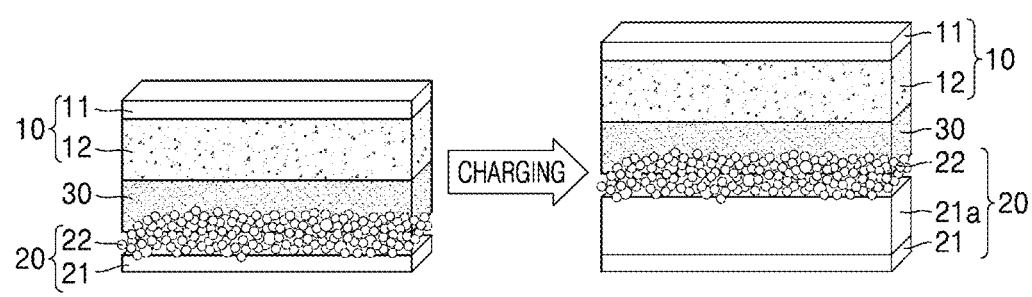
FIG. 2B is a perspective view illustrating a lithium metal layer formed during charge of the all-solid secondary battery of FIG. 2A.

FIG. 2B is a perspective view illustrating a lithium metal deposited layer 21a formed during charging of the all-solid secondary battery of FIG. 2A.

As shown in FIG. 2B, the all-solid secondary battery of FIG. 2A may have an alkali metal deposited layer 21a in an area between the anode current collector 21 and the anode active material layer 22 during charging. The alkali metal deposited layer 21a may be a lithium metal deposited layer, a sodium metal deposited layer, or a potassium metal deposited layer. For example, the alkali metal deposited layer 21a may be a lithium metal deposited layer.

In an initial stage of charging the battery, an alkali metal, for example, lithium metal, is inserted into the anode active material layer 22 of the all-solid secondary battery. As a result, the anode active material may form an alloy or a compound with the lithium ions that have moved from the cathode layer. When the battery is overcharged to exceed the capacity of the anode active material layer 22, lithium is deposited on a back surface of the anode active material layer 22, i.e., between the anode current collector 21 and the anode active material layer 22, as illustrated in FIG. 2B, and a metal deposited layer 21a is formed by lithium. This phenomenon may occur when the anode active material is formed of a material which is capable of forming an alloy or a compound with lithium, even though the anode active material itself does not include lithium metal. During discharge, lithium from the anode active material layer 22 and the lithium metal deposited layer 21a is ionized and moves toward the cathode layer. Thus, lithium may be used as an anode active material in the all-solid secondary battery. Also, since the anode active material layer 22 is disposed on the lithium metal deposited layer 21a, the anode active material layer 22 may prevent dendrites from growing in addition to protecting the lithium metal deposited layer 21a. As a result, the occurrence of a short-circuit, and a decrease in the capacity of the all-solid secondary battery may be prevented, and furthermore performance of the all-solid secondary battery may be improved.

For example, in the all-solid secondary battery, a ratio of a charging capacity of the anode active material layer 22 to a charging capacity of the cathode active material layer 12, i.e., a capacity ratio, may satisfy Inequality 1 below.

$$0.002 < b/a < 0.5 \qquad \text{Inequality 1:}$$

a: charging capacity (mAh) of the cathode active material layer 12 b: charging capacity (mAh) of the anode active material layer 22

In this regard, the charge capacity of the cathode active material layer 12 is obtained by multiplying a charge capacity density (mAh/g) of the cathode active material by a mass of the cathode active material in the cathode active material layer 12. When various types of cathode active materials are used, charge capacity density×mass values for the cathode active materials are calculated, respectively, and a sum of the individual values is regarded as the charge capacity of the cathode active material layer 12. The charge capacity of the anode active material layer 22 is calculated in the same manner. That is, the charge capacity of the anode active material layer 22 is obtained by multiplying a charge capacity density (mAh/g) of the anode active material by a mass of the anode active material of the anode active material layer 22. When various types of anode active materials are used, charge capacity density×mass values for all of the anode active materials are respectively calculated and a sum of the values is regarded as the charge capacity of the anode active material layer 22. In this case, the charge capacity densities of the cathode active material and the anode active material are determined using all-solid half-cells in which lithium metal is applied as a counter electrode. The charge capacities of the cathode active material layer 12 and the anode active material layer 22 are directly measured using the all-solid half-cells. The charge capacity density is calculated by dividing the charge capacity by the mass of each active material. The charge capacities of the cathode active material layer 12 and the anode active material layer 22 may be an initial charge capacity, as measured during a first charge cycle.

For example, in the all-solid secondary battery, a ratio of the charge capacity of the anode layer 20 to a charge capacity of the cathode layer 10 may be from about 0.2% to about 50%, or about 1% to about 40%, or about 1% to about 35%.

Figure 3A:
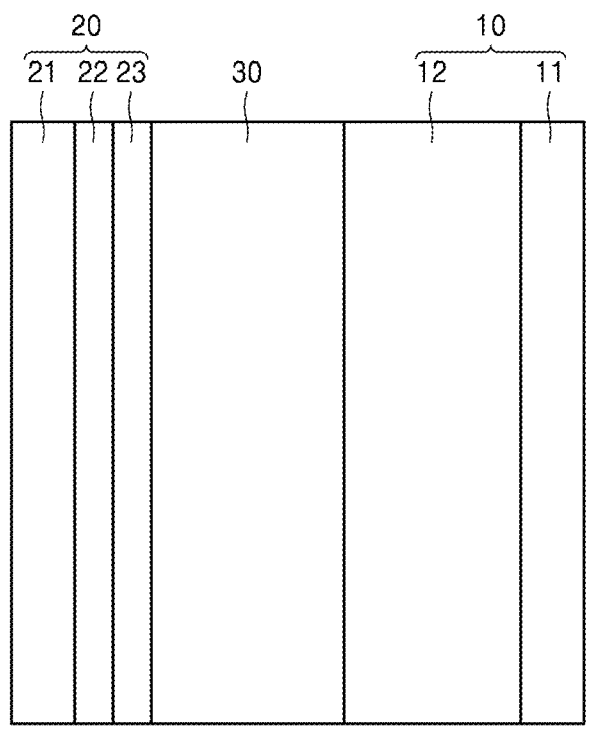
FIG. 3A is a schematic cross-sectional view of an embodiment of an all-solid secondary battery.

FIG. 3A is a schematic cross-sectional view of an all-solid secondary battery according to another embodiment.

As shown in FIG. 3A, the all-solid secondary battery may further include a thin film 23 disposed on the anode current collector 21. The thin film 23 may be interposed between the anode current collector 21 and the anode active material layer 22. The thin film may include a material which forms an alloy or a compound with an alkali metal.

Although the material of the anode current collector does not react with an alkali metal, the anode current collector 21 may make smooth deposition of an alkali metal layer, such as a lithium metal layer, thereon difficult. The thin film 23 may be used as a wetting layer to assist with the deposition of the alkali metal, such as lithium metal, so as to be deposited as a flat layer on the anode current collector 21.

The material forming an alloy with the alkali metal and used to form the thin film 23, may include silicon, magnesium, aluminum, lead, silver, tin, or a combination thereof. The material forming a compound with the alkali metal and used to form the thin film 23 may include carbon, titanium sulfide, iron sulfide, or a combination thereof. An amount of the material used to form the thin film 23 may be within a range that does not affect electrochemical properties of the electrodes and/or redox potentials of the electrodes. The thin film 23 may be applied on the surface of the anode current collector 21 to prevent cracks from occurring during charging cycles of the all-solid secondary battery, and may be formed as a flat layer. The thin film 23 may be applied by physical vapor deposition such as evaporation or sputtering, chemical deposition, or plating.

The thin film 23 may have a thickness of about 1 nm to about 500 nm. For example, the thin film 23 may have a thickness of about 2 nm to about 400 nm. For example, the thin film 23 may have a thickness of about 3 nm to about 300 nm. For example, the thin film 23 may have a thickness of about 4 nm to about 200 nm. For example, the thin film 23 may have a thickness of about 5 nm to about 100 nm.

Figure 3B:
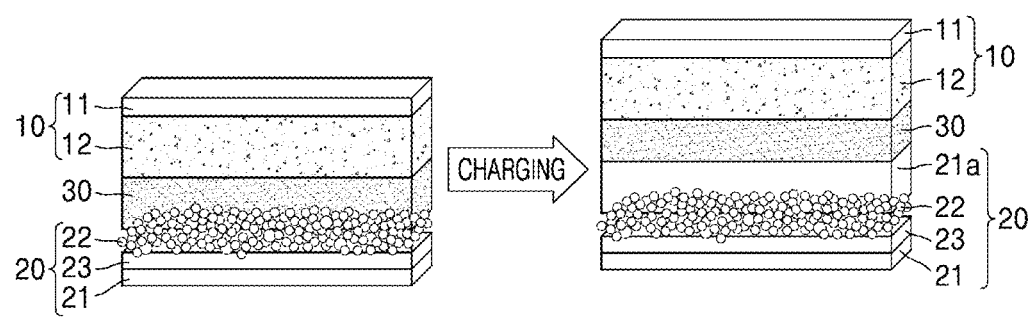
FIG. 3B is a perspective view illustrating a lithium metal layer formed during charge of the all-solid secondary battery of FIG. 3A.

FIG. 3B is a perspective view illustrating the formation of a lithium metal deposited layer 21a during charge of the all-solid secondary battery of FIG. 3A.

As shown in FIG. 3B, the all-solid secondary battery of FIG. 3A may include an alkali metal deposited layer 21a, such as a lithium metal deposited layer, formed on the anode active material layer 22, between the anode active material layer 22 and the anode current collector 21, or a combination thereof, during charge of the all-solid secondary battery.

The anode active material includes amorphous carbon and silicon, and the alkali metal deposited in the anode active material may form an alloy with silicon during charge of the all-solid secondary battery.

Figure 4:
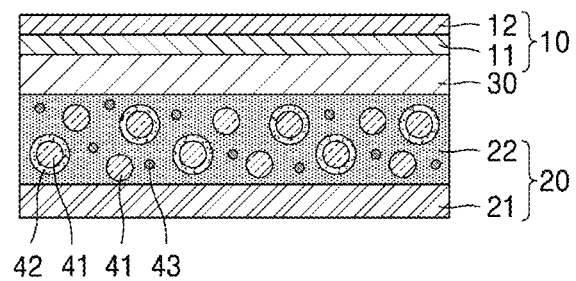
FIG. 4 is a schematic cross-sectional view of an embodiment of an all-solid secondary battery.

FIG. 4 is a schematic cross-sectional view of an all-solid secondary battery according to another embodiment.

As shown in FIG. 4, the all-solid secondary battery has a structure in which a lithium metal layer 42 formed on the surface of an anode active material 41 and amorphous carbon 43 are dispersed in the anode active material layer 22 during charging. This is because the lithium metal deposited layer 42 is formed on the surface of the silicon anode active material 41 and forms an alloy due to a large volume expansion rate of the silicon anode active material 41.

The solid electrolyte layer 30 may include a solid electrolyte such as $Li_2S-P_2S_5$, $Li_2S-P_2S_5-LiX$ (where X is a halogen atom), $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$ (where m and n are 1-6 and Z is Ge, Zn, or Ga), $Li_2S-GeS_2$, $Li_2S-SiS_2-Li_3PO_4$, $Li_2S-SiS_2-Li_pMO_q$ (where p and q are 1 to 6 and M is P, Si, Ge, B, Al, Ga, or In), $Li_xM'_yPS_zA_w$ (where x, y, z, and w are each independently a number from 0 to 6, M' is Ge, Sn, or Si, and A is F, Cl, Br, or I), $Li_{1-x}Ti_{2-x}Al(PO_4)_3$ (LTAP, where 0≤x≤4), $Li_{1+x+y}Al_xTi_{2-x}Si_yP_{3-y}O_{12}$ (where 0<x<2 and 0≤y<3), $BaTiO_3$, $Pb(Zr,Ti)O_3$ (PZT), $Pb_{1-x}La_xZr_{1-y}Ti_yO_3$ (PLZT, where 0≤x<1, and 0≤y<1), $PB(Mg_{3}Nb_{2/3})O_3-PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, lithium phosphate ($Li_3PO_4$), lithium titanium phosphate ($Li_xTi_y(PO_4)_3$, where 0<x<2 and 0<y<3), lithium aluminum titanium phosphate ($Li_xAl_yTi_z(PO_4)_3$, where 0<x<2, 0<y<1, and 0<z<3), $Li_{1+x+y}(Al, Ga)_x(Ti, Ge)_{2-x}Si_yP_{3-y}O_{12}$ (where 0≤x≤1 and 0≤y≤1), lithium lanthanum titanate ($Li_xLa_yTiO_3$, where 0<x<2 and 0<y<3), $Li_2O$, $LiAlO_2$, a $Li_2O-Al_2O_3-SiO_2-P_2O_5-TiO_2-GeO_2$-based ceramic, a Garnet-based ceramic, $Li_{3+x}La_3M_2O_{12}$ (where M is Te, Nb, or Zr), or a combination thereof.

For example, the solid electrolyte layer 30 may include a solid electrolyte including the compound of Formula 4:

$$Li_xM'_yPS_zA_w \qquad \text{Formula 4}$$

wherein x, y, z, and w are each independently a number from 0 to 6,

M' is Ge, Sn, or Si, and

A is F, Cl, Br, or I.

Since the solid electrolyte layer 30 includes the solid electrolyte represented by formula 4 above, the solid electrolyte has a high ionic conductivity in a range of about $10^{-3}$ Siemens per centimeter (S/cm) to about $10^{-2}$ S/cm at room temperature, accordingly, a close interface may be formed between the cathode layer 10 and the solid electrolyte layer 30 and/or between the anode layer 20 and the solid electrolyte layer 30 without causing reduction in ionic conductivity. In addition, an all-solid secondary battery including the solid electrolyte represented by Formula 4 above may have excellent battery performance such as rate properties, Coulombic efficiency, and lifespan characteristics.

The solid electrolyte layer 30 may include a crystalline or amorphous solid electrolyte. For example, the solid electrolyte layer 30 may include a mixed solid electrolyte including both a crystalline solid electrolyte and an amorphous solid electrolyte. For example, the solid electrolyte layer 30 may comprise, consist of, or consist essentially of a crystalline solid electrolyte. The solid electrolyte of the solid electrolyte layer 30 may be in the form of particles having an average particle diameter of 5.0 μm or less. For example, the solid electrolyte of the solid electrolyte layer 30 may have an average particle diameter of about 0.5 μm to about 5.0 μm. Definitions of the average particle diameter of the solid electrolyte included in the solid electrolyte layer 30 and methods of measuring the same are as described above, and thus a detailed description thereof will not be repeated. The solid electrolyte of the solid electrolyte layer 30 may form a close interface between the cathode layer 10 and the solid electrolyte layer 30 without causing short-circuits.

The solid electrolyte of the solid electrolyte layer 30 may be prepared by melt quenching or mechanical milling the starting materials (such as $Li_2S$ and $P_2S_5$) and heat-treating the resultant. When a sulfide-based solid electrolyte material including $Li_2S$—$P_2S_5$ is used to form the solid electrolyte, a mixed molar ratio of $Li_2S$ to $P_2S_5$, may be, for example, from about 50:50 to about 90:10.

The solid electrolyte layer 30 may further include a binder. The binder of the solid electrolyte layer 30 may be the same as or different from the binder of the anode active material layer. The solid electrolyte layer 30 may further include styrene butadiene rubber (SBR), polytetrafluoroethylene, polyvinylidene fluoride, polyethylene, polymethacrylate, polyacrylic acid, or a combination thereof.

The solid electrolyte layer 30 may have a thickness of about 10 μm to about 150 μm.

The solid electrolyte layer 30 may further include an alkali metal salt and/or an ionic liquid. For example, the solid electrolyte layer 30 may further include a lithium metal salt and/or an ionic liquid.

An amount of the lithium salt contained in the solid electrolyte layer 30 may be 1 molar (M) or greater. For example, the amount of the lithium salt contained in the solid electrolyte layer 30 may be from about 1 M to about 4 M. When the amount of the lithium salt is within the above-described range, the mobility of lithium ions may be increased in the solid electrolyte layer 30, thereby improving ionic conductivity The lithium salt may include LiSCN, $LiN(CN)_2$, $Li(CF_3SO_2)_3C$, $LiC_4F_9SO_3$, $LiN(SO_2CF_2CF_3)_2$, LiCl, LiF, LiBr, LiI, $LiB(C_2O_4)_2$, $LiBF_4$, $LiBF_3(C_2F_5)$, lithium bis(oxalato) borate (LiBOB), lithium oxalyldifluoro borate (LIODFB), lithium difluoro(oxalato) borate (LiDFOB), lithium bis(trifluoro methanesulfonyl)imide (LiTFSI, $LiN(SO_2CF_3)_2$), lithium bis(fluorosulfonyl)imide (LiFSI, $LiN(SO_2F)_2$), $LiCF_3SO_3$, $LiAsF_6$, $LiSbF_6$, $LiClO_4$, or a combination thereof. For example, the lithium salt may be an imide-based lithium salt. Examples of the imide-based lithium salt may include lithium bis(trifluoro methanesulfonyl)imide (LiTFSI, $LiN(SO_2CF_3)_2$) lithium bis(fluorosulfonyl)imide (LiFSI, $LiN(SO_2F)_2$), or a combination thereof. The lithium salt may maintain or improve ionic conductivity by appropriately maintaining chemical reactivity with the ionic liquid.

For example, the ionic liquid may include $Li_2S$—$P_2S_5$—LiX (where X is a halogen atom), or the like.

A weight ratio of the solid electrolyte to the ionic liquid in the solid electrolyte layer 30 may be from about 0.1:99.9 to about 90:10. For example, the weight ratio of the solid electrolyte to the ionic liquid in the solid electrolyte layer 30 may be from about 10:90 to about 90:10. For example, the weight ratio of the solid electrolyte to the ionic liquid in the solid electrolyte layer 30 may be from about 20:80 to about 90:10. For example, the weight ratio of the solid electrolyte to the ionic liquid in the solid electrolyte layer 30 may be from about 30:70 to about 90:10. For example, the weight ratio of the solid electrolyte to the ionic liquid in the solid electrolyte layer 30 may be from about 40:60 to about 90:10. For example, the weight ratio of the solid electrolyte to the ionic liquid in the solid electrolyte layer 30 may be from about 50:50 to about 90:10. The solid electrolyte layer 30 having a weight ratio of the solid electrolyte to the ionic liquid within the ranges above may maintain or improve ionic conductivity by increasing an electrochemical contact area with an electrode. A battery including the solid electrolyte layer 30 may have increased energy density and discharge capacity and/or improved rate properties.

Figure 5:
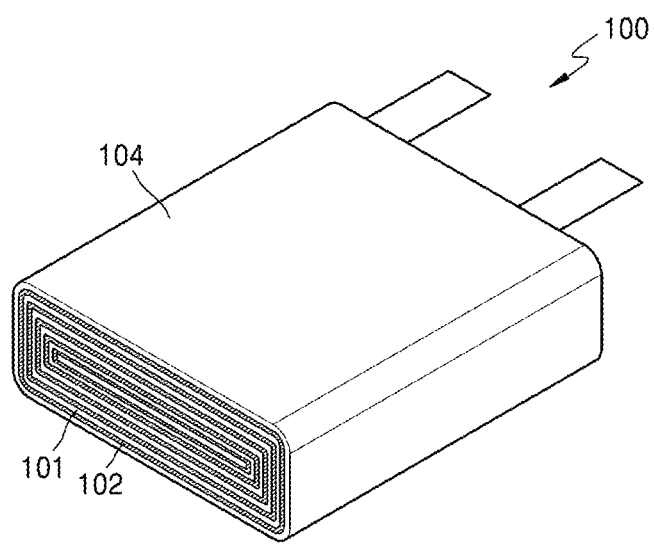
FIG. 5 is a schematic view illustrating a structure of an embodiment of an all-solid secondary battery.

FIG. 5 is a schematic view illustrating a structure of an all-solid secondary battery 100 according to an embodiment.

As shown in FIG. 5, the all-solid secondary battery 100 includes a cathode 101, an anode 102, and a battery can 104 accommodating the cathode 101 and the anode 102.

The cathode 101 may be the same as the afore-mentioned cathode layer 10.

The cathode layer 101 may be formed by coating a cathode active material on a surface of a cathode current collector formed of aluminum, or the like. Alternatively, the cathode 101 may be formed by casting the cathode active material on a separate support and stacking a cathode active material film separated from the support on a current collector.

The anode 102 may be the same as the afore-mentioned anode 20.

The afore-mentioned solid electrolyte layer 30 may be interposed between the cathode 101 and the anode 102.

The all-solid secondary battery 100 may be formed as a single unit cell having a cathode/separator/anode structure, a bi-cell having a cathode/separator/anode/separator/cathode structure, or a stacked battery having a structure in which a unit cell is repeated.

The shape of the all-solid secondary battery 100 is not particularly limited and may be, for example, a coin, button, sheet, stack, cylindrical, thin-film, or horn shape. Also, the all-solid secondary battery 100 may be applied to a large-size battery used in an electric vehicle, or the like. For example, the all-solid secondary battery 100 may be used in a hybrid vehicle such as a plug-in hybrid electric vehicle (PHEV). Also, the all-solid secondary battery 100 may be used in other fields/devices which benefit from a large amount of power storage. For example, the all-solid secondary battery 100 may be used in an E-bike and in an electric tool.

Hereinafter, the present disclosure will be described in more detail according to the following examples and comparative examples. However, the following examples are merely presented to exemplify the present disclosure, and the scope of the present disclosure is not limited thereto.

EXAMPLES

Preparation of All-solid Secondary Battery

Example 1: Preparation of all-Solid Secondary Battery

An all-solid secondary battery was prepared under an argon gas atmosphere as follows.

Li$_2$S powder (Sigma Aldrich, 99%), P$_2$S$_5$ powder (Sigma Aldrich, 99%), and LiCl powder (Acros Organic, 99%) were respectively weighed in a stoichiometric molar ratio to obtain a Li$_6$PS$_5$Cl sulfide solid electrolyte, and mixed together. The mixture was mechanically milled using zirconia balls (having a diameter of 10 mm) and then subjected to high energy ball milling at a rotation speed of 600 rotations per minute (rpm) for about 45 hours to obtain a pulverized mixture. The pulverized mixture was stirred in anhydrous ethanol (Wako, 99.5%) at room temperature for 24 hours to obtain a homogeneous dark brown mixture. The mixture was dried in a vacuum at 80° C. for 3 hours and pulverized to obtain cathode layer-forming Li$_6$PS$_5$Cl sulfide solid electrolyte powder (D50: 0.6 μm). Also, a solid electrolyte layer-forming Li$_6$PS$_5$Cl sulfide solid electrolyte powder was prepared in a similar manner except that the average particle diameter D50 of the Li$_6$PS$_5$Cl sulfide solid electrolyte powder was adjusted to 3 μm.

Separately, LiNi$_{0.8}$Co$_{0.1}$Mn$_{0.1}$O$_2$ as a cathode active material, the Li$_6$PS$_5$Cl sulfide solid electrolyte powder (D50: 0.6 μm), carbon black (Super-P, Timcal Ltd.) as a conductive material, and polytetrafluoroethylene (PTFE, Dupont) as a binder were mixed in a weight ratio of 89:8:2:1, and the mixture was inserted into a molding jig and press-molded at a pressure of 7 tons per square centimeter (ton/cm$^2$) to form a cathode sheet. The cathode sheet was stacked on an 18 μm-thick aluminum foil, as a cathode current collector, and pressed to form a cathode layer.

Separately, a polyacrylic binder (produced by Xeon Corporation) was added to the solid electrolyte layer-forming Li$_6$PS$_5$Cl sulfide solid electrolyte powder in a weight ratio of 99:1 to prepare a mixture. Xylene and diethylbenzene were added to the mixture and the mixture was stirred to prepare a solid electrolyte layer-forming slurry. The solid electrolyte layer-forming slurry was coated on a nonwoven fabric by using a blade coater and dried in ambient air at 40° C. and then further dried in a vacuum at 40° C. for 12 hours to form a solid electrolyte layer.

Separately, a Ni foil (having a thickness of 10 μm) was prepared as an anode current collector. Silver (having a primary particle diameter of 60 nm) and carbon black powder (having a primary particle diameter of 35 nm) were mixed in a weight ratio of 25:75 to prepare an anode active material. A copolymer represented by Formula 3-1 below (Nisshin Kasei) as a binder was added, in an amount of 7 wt % based on the anode layer, to N-methylpyrrolidone (NMP) contained in a vessel together with the mixture of silver (having a primary particle diameter of 60 nm) and carbon black powder (having a primary particle diameter of 35 nm) and the mixture was stirred to prepare an anode layer-forming slurry. The anode layer-forming slurry was coated on the Ni foil by using a blade coater and dried in ambient air at 80° C. for 20 minutes and then further dried in a vacuum at 100° C. for 12 hours to prepare an anode layer.

The anode layer, the solid electrolyte layer, and the cathode layer were sequentially stacked in a jig and press-molded at a pressure of 7 ton/cm$^2$, and then integrated to prepare an all-solid secondary battery.

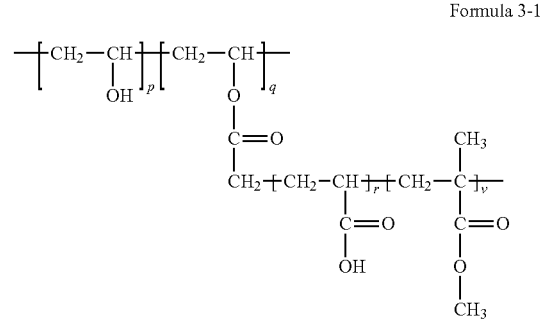

Formula 3-1

In Formula 3-1,
p is an integer of 50 to 60,
q is an integer of 5 to 8,
r is an integer of 16 to 20, and
v is an integer of 16 to 20.

Comparative Example 1: Preparation of all-Solid Secondary Battery

An all-solid secondary battery was prepared in the same manner as in Example 1, except that a polyvinylidene fluoride binder (#9300, Kureha Corporation) was used as a binder in the preparation of the anode layer instead of the copolymer binder according to Example 1.

Analysis Example 1: SEM Image

Figure 6:
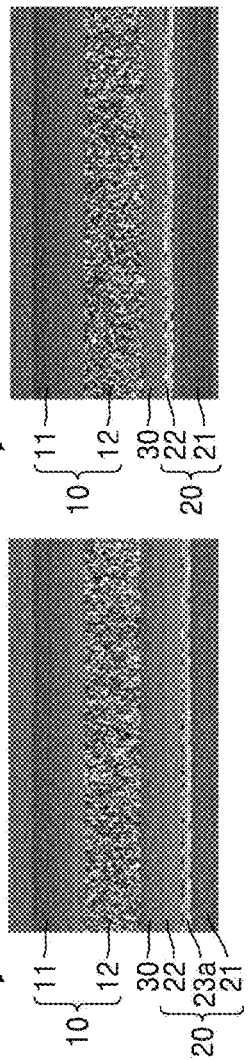
FIGS. 6A to 6C are scanning electron microscope (SEM) images of cross-sections of an all-solid secondary battery according to Example 1 disassembled in an initial stage (FIG. 6A), in a charging stage of charging at a rate of 0.1 C after a formation process (FIG. 6B), and in a discharging stage of discharging at a rate of 0.1 C (FIG. 6C), respectively.

The all-solid secondary battery according to Example 1 was disassembled respectively in an initial state (a), in a charge state at a constant current rate of 0.1 C after a formation process (b), and in a discharge state at a constant current rate of 0.1 C (c), and then cross-sections thereof were analyzed by scanning electron microscopy (SEM). The results are shown in FIG. 6. An S-5500 (Hitachi) was used for scanning electron microscopy.

The formation process was performed as follows.

The all-solid secondary battery according to Example 1 was charged with a constant current rate of 0.1 C at 60° C. until a voltage reached 4.25 V (vs. Li), and while maintaining the voltage of 4.25 V in a constant voltage mode, the charging process was cut-off at a rate of 0.05 C. Subsequently, the all-solid secondary battery was discharged with a constant current rate of 0.1 C until the voltage reached 2.5 V (vs. Li) (Formation operation, 1$^{st}$ cycle). This charge/discharge process was further performed twice.

Referring to FIG. 6, although a lithium metal deposited layer was not observed between the anode current collector 21 and the anode active material layer 22 in the all-solid secondary battery according to Example 1 in the initial stage and after discharging with the rate of 0.1 C, it was confirmed that a lithium metal deposited layer 23$a$ was observed after charging with a rate of 0.1 C.

Evaluation Example 1: Binding Strength—Evaluation of Peel Strength

The anode current collector and the anode active material layer used in each of the all-solid secondary batteries prepared according to Example 1 and Comparative Example 1 were subjected to a peel test using a universal testing machine (UTM, Lloyd LR-10K) to evaluate binding strength between the anode current collector and the anode active material layer. The results are shown in FIG. 7.

Figure 7:
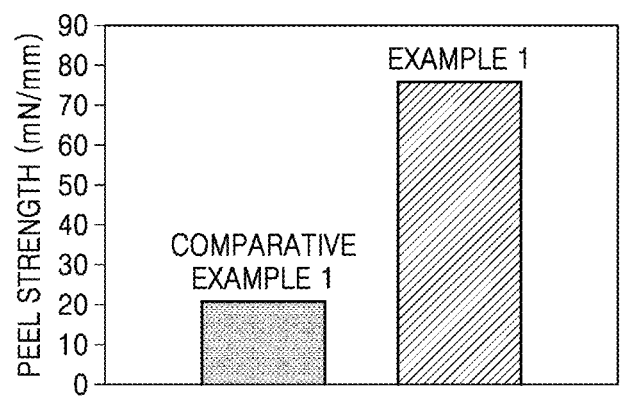
FIG. 7 is a graph illustrating the peel strength (milliNewtons per millimeter) between an anode current collector and an anode active material layer used in each of the all-solid secondary batteries according to Example 1 and Comparative Example 1.

Referring to FIG. 7, a peel strength of the anode current collector and the anode active material layer used in the preparation of the all-solid secondary battery according to Example 1 was about 78.74 milliNewtons per millimeter (mN/mm), and a peel strength of the anode current collector and the anode active material layer used in the preparation of the all-solid secondary battery according to Comparative Example 1 was about 24.4 mN/mm. Thus, it was confirmed that a binding strength between the anode current collector and the anode active material layer used in the preparation of the all-solid secondary battery according to Example 1 was greater than a binding strength between the anode current collector and the anode active material layer used in the preparation of the all-solid secondary battery according to Comparative Example 1 by about 3 times or more.

Evaluation Example 2: Impedance—Evaluation of Interfacial Resistance

Impedance of each of the all-solid secondary batteries according to Example 1 and Comparative Example 1 was evaluated after the 1st cycle.

Each of the all-solid secondary batteries was charged with a constant current rate of 0.1 C at 60° C. until a voltage reached 4.25 V (vs. Li), and while maintaining the voltage of 4.25 V in a constant voltage mode, the charging process was cut-off at a rate of 0.05 C. Subsequently, the all-solid secondary battery was discharged with a constant current rate of 0.1 C until the voltage reached 2.5 V (vs. Li) (Formation operation, $1^{st}$ cycle). This charging/discharging process was further performed twice to complete the formation operation.

Figure 8:
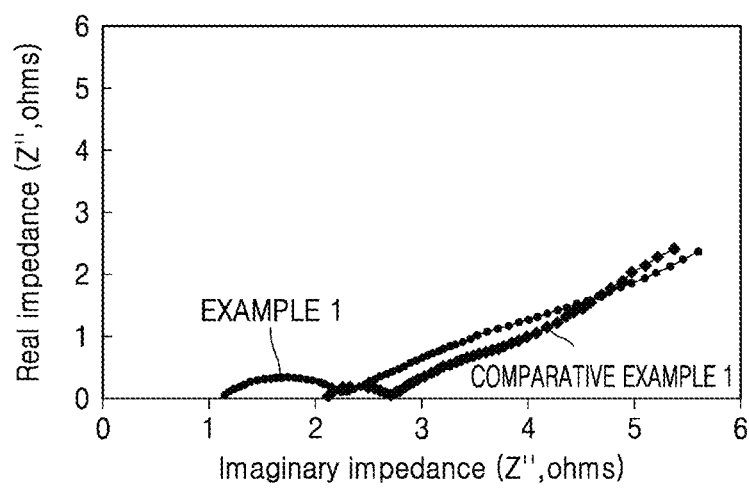
FIG. 8 is a graph imaginary impedance (Z", ohms) versus real impedance (Z', ohms) illustrating the results of impedance analysis of each of the all-solid secondary batteries according to Example 1 and Comparative Example 1 after a $1^{st}$ cycle.

Each of the all-solid secondary batteries was charged with a constant current rate of 0.1 C (0.38 milliampere per square centimeter, mA/cm$^2$) at 60° C. until the voltage reached 4.25 V (vs. Li), and while maintaining the voltage of 4.25 V in a constant voltage mode, the charge process was cut-off at a rate of 0.05 C. Impedance after the $1^{st}$ cycle was evaluated by measuring resistance while applying a voltage bias of 10 mV thereto at 25° C. in a frequency range of about $10^6$ to about 0.1 MHz according to a 2-probe method using an impedance analyzer (Solartron 1260A Impedance/Gain-Phase Analyzer). Nyquist plots, as the results, are shown in FIG. 8. In FIG. 8, bulk resistance of an electrode is determined based on a position and a size of a semicircle and indicates a difference between a left X-intercept and a right X-intercept.

Referring to FIG. 8, it may be confirmed that the all-solid secondary battery according to Example 1 had lower resistance than that of the all-solid secondary battery according to Comparative Example 1.

Evaluation Example 3: Charge/discharge Test—Evaluation of Rate Properties, Coulombic Efficiency, and Lifespan Characteristics Charge and discharge characteristics of the all-solid secondary batteries according to Example 1 and/or Comparative Example 1 were evaluated using a charger/discharger (TOYO-3100 manufactured by TOYO).

3-1. Evaluation of Rate Properties

Figure 9:
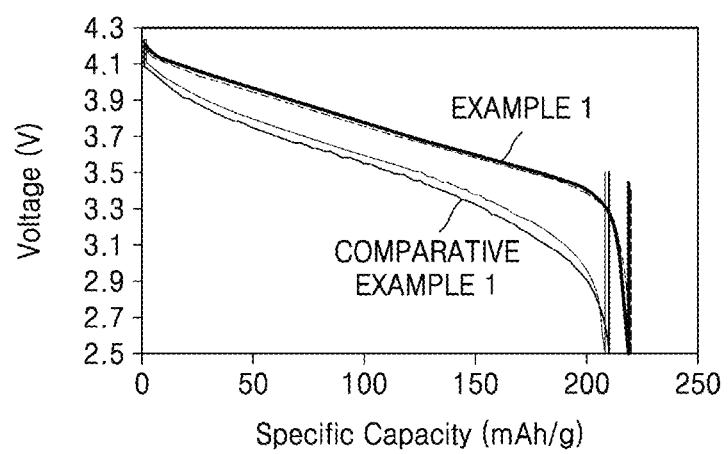
FIG. 9 is a graph of voltage (V) versus specific capacity (milliampere hours per gram, mAh/g) illustrating the results of rate capability of each of the all-solid secondary batteries according to Example 1 and Comparative Example 1 during charge and discharge at 60° C. in a voltage range of 2.5 V to 4.25 V.

Each of the all-solid secondary batteries according to Example 1 and Comparative Example 1 was charged with a rate of 0.1 C at 60° C. until a voltage reached 4.25 V (vs. Li) and discharged with a rate of 0.2 C until the voltage reached 2.5 V (vs. Li). Then, the all-solid secondary battery was rested for 10 minutes. Then, in a second cycle and subsequent cycles, each of the all-solid secondary batteries was charged with a rate of 0.1 C at the same temperature until the voltage reached 4.25 V (vs. Li) and discharged with a rate of 0.33 C or 1.0 C until the voltage reached 2.5 V (vs. Li). The results are shown in FIG. 9. Rate properties were calculated according to Equation 1 below.

$$\text{Rate property (\%)} = [(\text{discharge capacity at } 1.0 \text{ C})/(\text{discharge capacity at } 0.33 \text{ C})] \times 100\% \quad \text{Equation 1}$$

Referring to FIG. 9, rate properties of the all-solid secondary batteries according to Example 1 and Comparative Example 1 were 95.8% and 95.4%, respectively. Thus, it was confirmed that rate properties of the all-solid secondary battery according to Example 1 were better than those of the all-solid secondary battery according to Comparative Example 1.

3-2. Evaluation of Coulombic Efficiency

The all-solid secondary battery according to Example 1 was charged with a constant current rate of 0.1 C at 60° C. until a voltage reached 4.25 V (vs. Li), and while maintaining the voltage of 4.25 V in a constant voltage mode, the charging process was cut-off at a rate of 0.05 C. Subsequently, the all-solid secondary battery was discharged with a constant current rate of 0.1 C until the voltage reached 2.5 V (vs. Li) (Formation operation, $1^{st}$ cycle). This charge/discharge process was further performed twice to complete the formation operation.

The all-solid secondary battery having gone through the formation operation was charged with a constant current rate of 0.5 C at 60° C. in a voltage range of 2.5 to 4.5 V (vs Li metal) and discharged with a constant current rate of 0.1 C until the voltage reached a cut-off voltage of 2.5 V.

Figure 10:
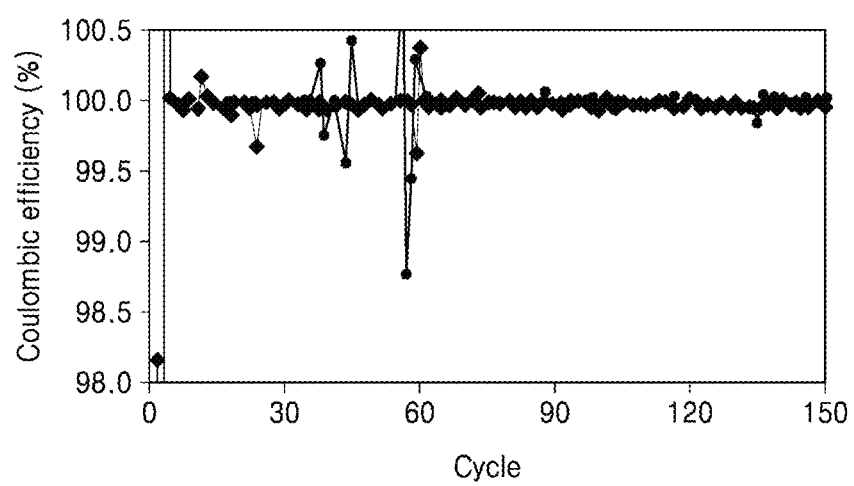
FIG. 10 is a graph of coulombic efficiency (percent, %) versus cycle number illustrating the coulombic efficiency of the all-solid secondary battery according to Example 1 during charge and discharge at 60° C. in a voltage range of 2.5 V to 4.25 V.

The above-described charging/discharging process was repeated 150 times in total. The results are shown in FIG. 10. Coulombic efficiency was calculated according to Equation 2 below.

$$\text{Coulombic efficiency (\%)} = [(\text{discharge capacity at each cycle})/(\text{charge capacity at each cycle})] \times 100\% \quad \text{Equation 2}$$

Referring to FIG. 10, the coulombic efficiency of the all-solid secondary battery according to Example 1 was 99.9%.

3-3. Evaluation of Lifespan Characteristics

Each of the all-solid secondary batteries according to Example 1 and Comparative Example 1 was charged with a current rate of 0.1 C at 60° C. until a voltage reached 4.25 V (vs. Li), and while maintaining the voltage of 4.25 V, the charging process was cut-off at a rate of 0.05 C. Subsequently, the all-solid secondary battery was discharged with a rate of 0.1 C until the voltage reached 2.5 V (vs. Li) (Formation operation, $1^{st}$ cycle). This charge/discharge process was further performed twice to complete the formation operation.

The all-solid secondary battery having gone through the formation operation was charged with a rate of 0.5 C at the same temperature and discharged at a rate of 0.5 C until the voltage reached 2.5 V (vs. Li).

Figure 11:
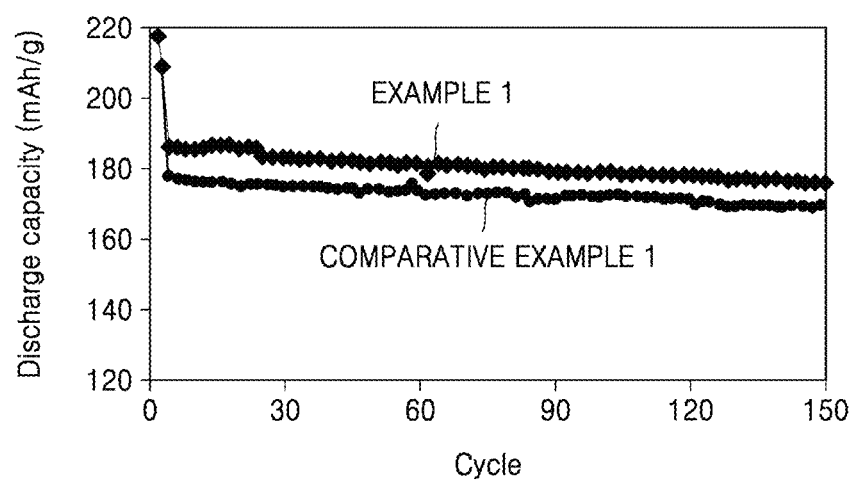
FIG. 11 is a graph of discharge specific capacity (milliampere hours per gram, mAh/g) versus cycle number illustrating the results of lifespan analysis of each of the all-solid secondary batteries according to Example 1 and Comparative Example 1 during charge and discharge at 60° C. in a voltage range of 2.5 V to 4.25 V.

The above-described charge/discharge process was repeated 150 times in total. The results are shown in FIG. 11. Lifespan characteristics (i.e., capacity retention ratio) were calculated according to Equation 3 below.

Lifespan characteristics (%)=[(discharge capacity after 150$^{th}$ cycle)/(discharge capacity after 3$^{rd}$ cycle)]×100%  Equation 3

Referring to FIG. 11, the all-solid secondary battery according to Example 1 exhibited about 96% of lifespan characteristics after the 150$^{th}$ cycle, and the all-solid secondary battery according to Comparative Example 1 exhibited about 95% of lifespan characteristics after the 150$^{th}$ cycle. As a result, it was confirmed that the all-solid secondary battery according to Example 1 had a higher capacity than that of the all-solid secondary battery according to Comparative Example 1 by about 5%.

Since the anode active material layer of the anode layer of the all-solid secondary battery includes the binder having the polyvinyl alcohol-based copolymer or a mixture thereof, strength and flexibility of the anode active material layer may be improved as well as the binding strength between the anode current collector and the anode active material layer or the binding strength of the anode active material layer. In addition, the all-solid secondary battery may have reduced interfacial resistance between the anode layer and the solid electrolyte layer, and thus battery performance such as rate properties, coulombic efficiency, and lifespan characteristics may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
a cathode;
an anode; and
a solid electrolyte interposed between the cathode and the anode,
wherein the cathode comprises a cathode active material,
wherein the anode comprises an anode current collector and an anode active material layer on the anode current collector,
wherein the anode active material layer comprises a binder and an anode active material,
wherein the binder comprises a polyvinyl alcohol copolymer represented by at least one of Formulae 1 to 3:

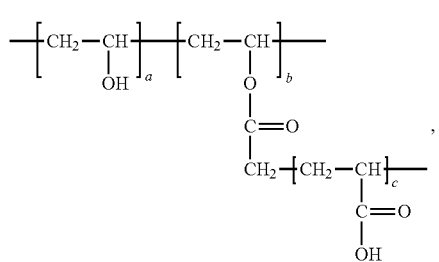

Formula 1

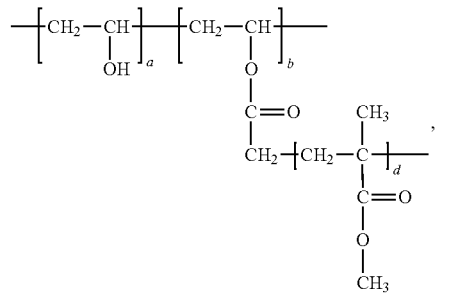

Formula 2

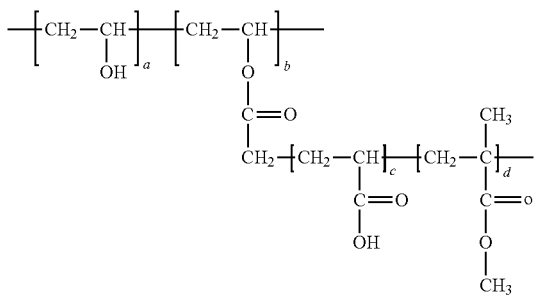

Formula 3 wherein, in Formulae 1 to 3,
a is an integer of 30 to 80,
b is an integer of 3 to 20,
c is an integer of 5 to 40, and
d is an integer of 5 to 30.

2. The all-solid secondary battery of claim 1, wherein an amount of the binder is in a range of about 0.3 weight percent to about 15 weight percent, based on a total weight of the anode active material.

3. The all-solid secondary battery of claim 1, wherein the binder has a weight average molecular weight of about 10,000 Daltons to about 1,000,000 Daltons.

4. The all-solid secondary battery of claim 1, wherein
wherein, in Formulae 1 to 3,
a is an integer of 50 to 60,
b is an integer of 5 to 8,
c is an integer of 16 to 20, and
d is an integer of 16 to 20.

5. The all-solid secondary battery of claim 1, wherein the anode active material comprises a material which forms an alloy or a compound with an alkali metal.

6. The all-solid secondary battery of claim 1, wherein the anode active material comprises amorphous carbon, gold, platinum, palladium, silicon, silver, aluminum, bismuth, tin, zinc, or a combination thereof.

7. The all-solid secondary battery of claim 6, wherein the anode active material comprises amorphous carbon and gold, platinum, palladium, silicon, silver, aluminum, bismuth, tin, zinc, or a combination thereof.

8. The all-solid secondary battery of claim 1, wherein the anode active material does not comprise an alkali metal prior to a first charge or at a complete discharge of the all-solid secondary battery.

9. The all-solid secondary battery of claim 1, wherein the anode active material comprises particles having an average particle diameter of 4 micrometers or less.

10. The all-solid secondary battery of claim 1, wherein the anode active material layer has a thickness of about 1 micrometer to about 20 micrometers.

11. The all-solid secondary battery of claim 1, further comprising an alkali metal layer between the anode current collector and the anode active material layer.

12. The all-solid secondary battery of claim 1, further comprising a film comprising a material which forms an alloy with an alkali metal or a compound with an alkali metal, wherein the material is on the anode current collector, and
wherein the film is disposed between the anode current collector and the anode active material layer.

13. The all-solid secondary battery of claim 12, wherein the material which forms an alloy with the alkali metal comprises silicon, magnesium, aluminum, lead, silver, tin, or a combination thereof.

14. The all-solid secondary battery of claim 12, wherein the material which forms a compound with the alkali metal comprises carbon, titanium sulfide, iron sulfide, or a combination thereof.

15. The all-solid secondary battery of claim 12, wherein the film has a thickness of about 1 nanometer to about 500 nanometers.

16. The all-solid secondary battery of claim 12, wherein the alkali metal layer is on the anode active material layer after charging of the all-solid secondary battery.

17. The all-solid secondary battery of claim 1, wherein the anode active material comprises amorphous carbon and silicon, and
an alkali metal is on the anode active material and forms an alloy with the silicon during charge of the all-solid secondary battery.

18. The all-solid secondary battery of claim 1, wherein the solid electrolyte layer comprises a solid electrolyte comprising $Li_2S$—$P_2S_5$, $Li_2S$—$P_2S_5$—LiX where X is a halogen atom, $Li_2S$—$P_2S_5$—$Li_2O$, $Li_2S$—$P_2S_5$—$Li_2O$-LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, where m and n are 1 to 6 and Z is Ge, Zn, or Ga, $Li_2S$—$GeS_2$, $Li_2S$—$SiS_2$—$Li_3PO_4$, $Li_2S$—$SiS_2$—$Li_pMO_q$, where p and q are 1 to 6 and M is P, Si, Ge, B, Al, Ga, or In, $Li_xM'_yPS_zA_w$, where x, y, z, and w are each independently a number from 0 to 6, M' is Ge, Sn, or Si, and A is F, Cl, Br, or I, $Li_{1+x}Ti_{2-x}Al(PO_4)_3$, where $0 \leq x \leq 4$, $Li_{1+x+y}Al_xTi_{2-x}Si_yP_{3-y}O_{12}$, where $0<x<2$ and $0 \leq y<3$, $BaTiO_3$, $Pb(Zr_aTi_{1-a})O_3$ wherein $0 \leq a \leq 2$, $Pb_{1-x}La_xZr_{1-y}Ti_yO_3$, where $0 \leq x<1$ and $0 \leq y<1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$, where $0<x<2$ and $0<y<3$, $Li_xAl_yTi_z(PO_4)_3$, where $0<x<2$, $0<y<1$, and $0<z<3$, $Li_{1+x+y}(Al_aGa_{1-a})_x(Ti_bGe_{1-b})_{2-x}Si_yP_{3-y}O_{12}$, where $O \leq x \leq 1$ and $0 \leq y \leq 1$, $Li_xLa_yTiO_3$ where $0<x<2$ and $0<y<3$, $Li_2O$, $LiAlO_2$, $Li_2O$—$Al_2O_3$—$SiO_2$—$P_2O_5$—$TiO_2$—$GeO_2$, a Garnet ceramic, $Li_{3+x}La_3M_2O_{12}$, where M is Te, Nb, or Zr, or a combination thereof.

19. The all-solid secondary battery of claim 1, wherein the solid electrolyte comprises a solid electrolyte of $Li_xM'_yPS_zA_w$, where x, y, z, and w are each independently a number from 0 to 6, M' is Ge, Sn, or Si, and A is F, Cl, Br, or I.

20. The all-solid secondary battery of claim 1, wherein the solid electrolyte further comprises a binder.

21. The all-solid secondary battery of claim 20, wherein the binder of the solid electrolyte is the same as or different than the binder of the anode active material layer.

\* \* \* \* \*